United States Patent [19]
Swanson

[11] 3,924,709
[45] Dec. 9, 1975

[54] UNLOADING ASSEMBLY FOR SHOPPING CART

[76] Inventor: Russell K. Swanson, 3212 Coleman Road, Kansas City, Mo. 64111

[22] Filed: Aug. 19, 1974

[21] Appl. No.: 498,603

[52] U.S. Cl. .............. 186/1 AC; 198/203; 214/44 R
[51] Int. Cl.² ......................................... E04H 3/04
[58] Field of Search ............... 198/202, 20 T, 203; 186/1 AC; 214/44 R, 46, 83.36

[56] References Cited
UNITED STATES PATENTS

| 207,626 | 9/1878 | Sargent | 198/202 X |
|---|---|---|---|
| 3,115,975 | 12/1963 | Thompson | 214/44 R |
| 3,306,398 | 2/1967 | Lachance | 186/1 AC |
| 3,311,197 | 3/1967 | Lachance | 186/1 AC |

*Primary Examiner*—Robert J. Spar
*Assistant Examiner*—George F. Abraham
*Attorney, Agent, or Firm*—Schmidt, Johnson, Hovey & Williams

[57] ABSTRACT

An unloading assembly for shopping carts, which assembly moves the contents of the cart from the cart onto a stand, which stand may contain a scanner head for reading the prices on the individual items moved from the cart and across the top of the stand. Movement of the contents of the cart is accomplished by a belt which is positioned in the bottom of the basket of the cart and trained over a pair of spaced idler rollers, there being driving means carried by the stand whereby a pair of driven rollers of the driving means may be brought into engagement with the conveyor belt and one of the idler rollers and thus drive the belt and move the contents of the basket therefrom and onto the stand. An elevating mechanism may be provided on the stand to vertically shift the driving means and the cart to a position where the bottom of the cart basket is aligned with the top of a stand when the top of the stand is initially at a greater height than the bottom of the basket.

10 Claims, 10 Drawing Figures

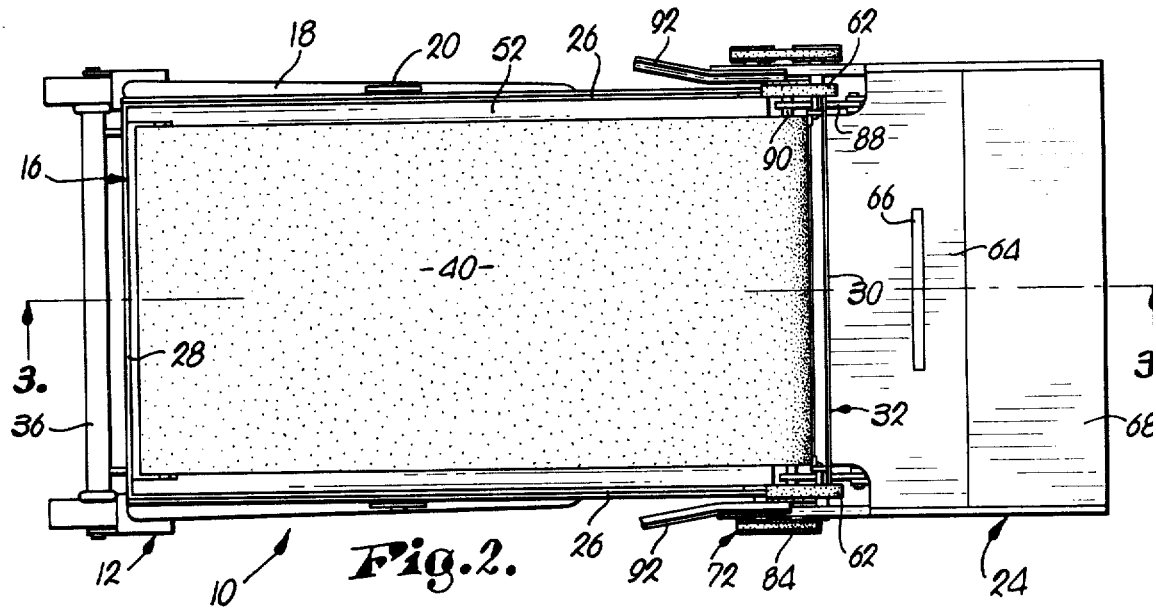
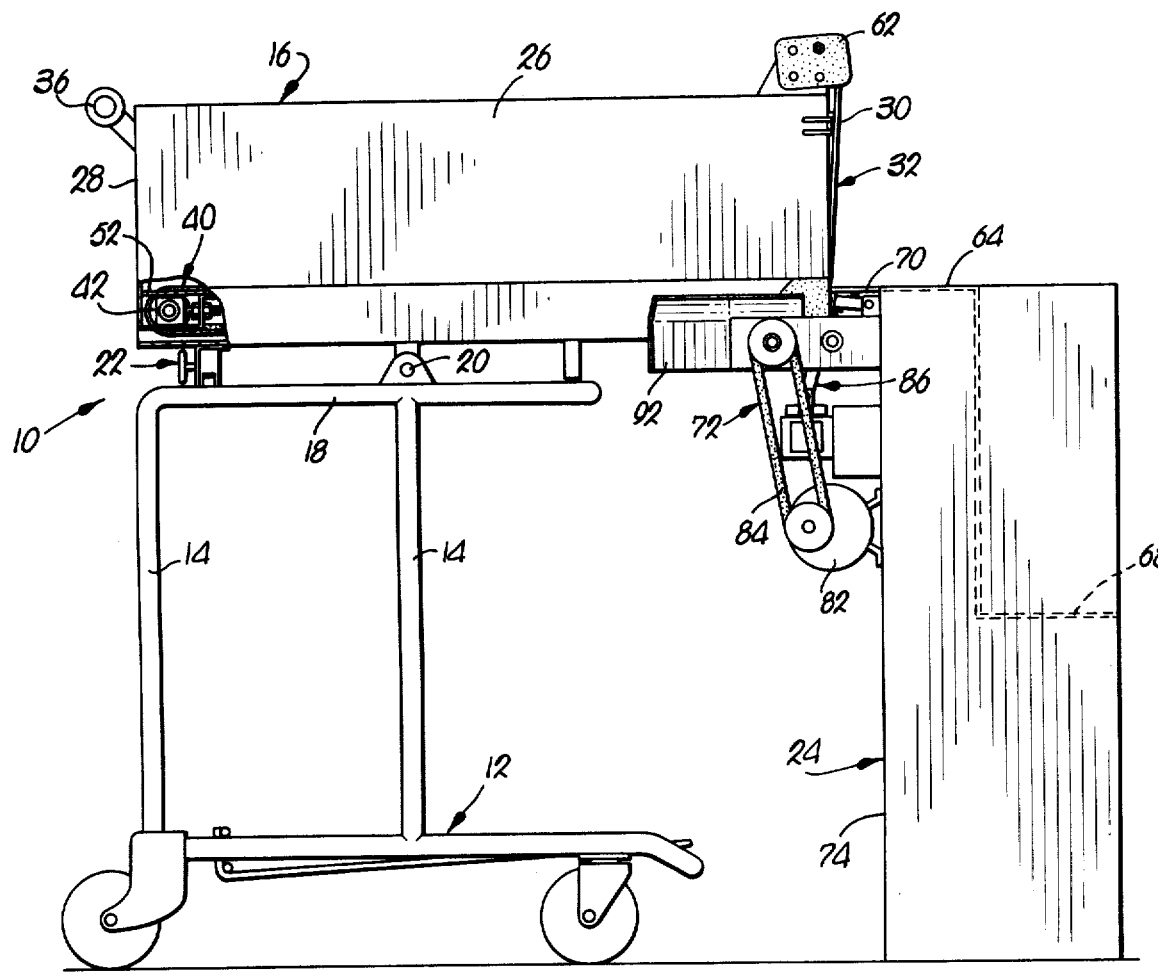

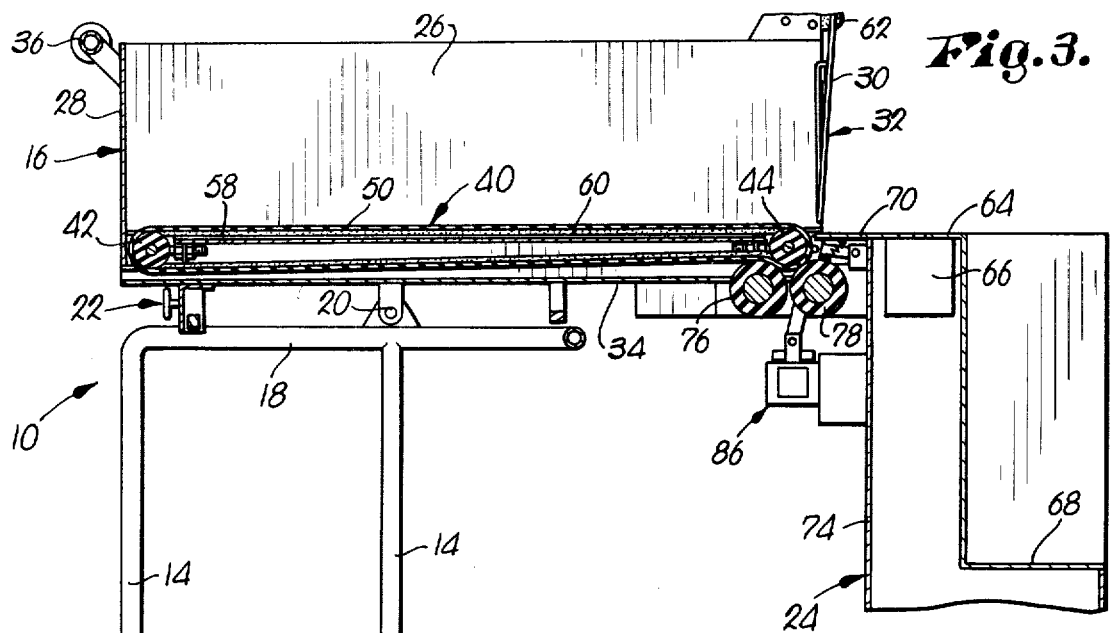
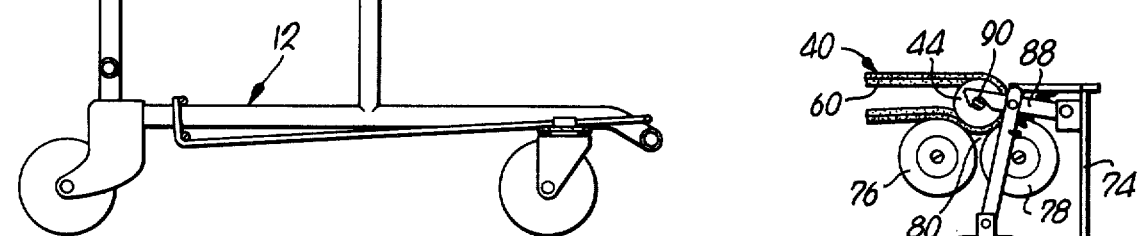
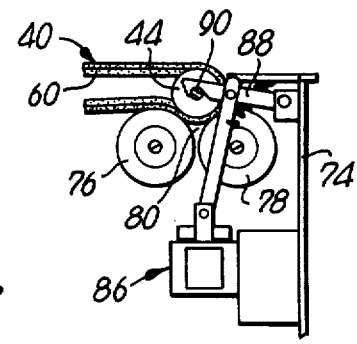
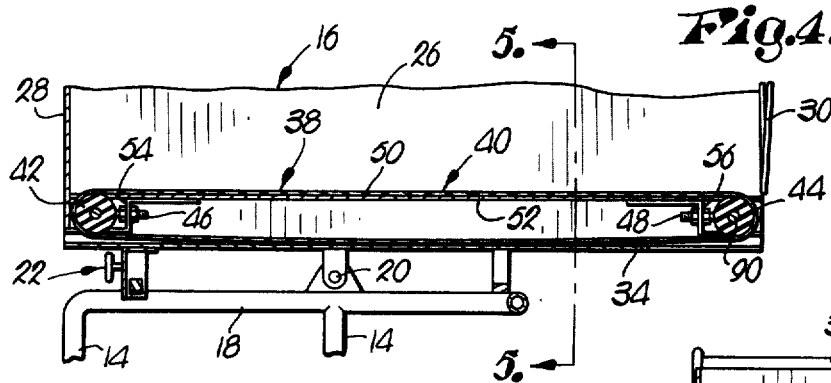
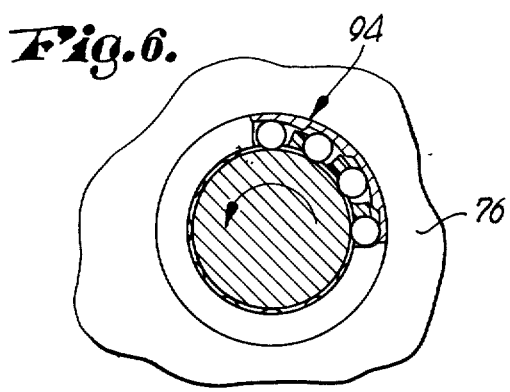
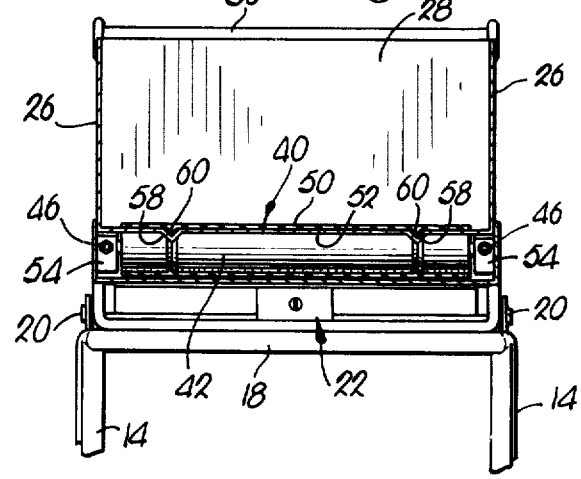

UNLOADING ASSEMBLY FOR SHOPPING CART

This invention relates to an unloading assembly for shopping carts such as those used in grocery stores and other retail establishments, wherein a check-out counter or stand is employed to receive from the cart the contents thereof. In most advanced developments there is provided, in the counter or check-out stand, a scanner head which is capable of "reading" indicia which has been printed upon the items sold by the store within which such carts are used and particularly upon packages of food items, such printed markings becoming standardized within the food industry.

It is the most important object of this invention to provide an unloading assembly which includes driving means carried by the stand or counter, which driving means includes a pair of driven rollers and a power source therefor, the driven rollers being engageable with an idler roller which is carried by the shopping cart, there being a conveyor belt trained over said idler roller whereby said roller and a stretch of the belt may be positioned within a seat provided between the two driven rollers to thereby cause driving of the conveyor or belt to unload the contents of the cart in a forward direction and across the stand.

Yet another significant object of this invention is to provide, within a shopping cart, a movable conveyor belt which, in essence, constitutes the bottom of the basket of the cart, the merchandise placed in the basket resting either directly or indirectly thereupon whereby, upon movement of the conveyor belt, the merchandise is conveyed in a selected direction and to a point of delivery across a scanner head or onto a receiving counter.

Yet another important aim of the present invention is to provide an unloading assembly for a shopping cart which includes driving means, the driving means being mounted on the stand, scanner module, or counter to which the products are to be delivered, the driving means including a pair of driven rollers and a power source therefor, which driven rollers define therebetween a seat, which seat receives the normally forwardmost idler roller of a pair of such rollers carried by the basket of the cart whereby, upon actuation of said power source, the driven rollers are rotated to cause movement of the idler roller and, therefore, movement of the conveyor belt in the desired direction.

Yet another object of the invention is to provide an unloading assembly for shopping carts wherein the driving means, as hereinabove described, is shiftable by an elevating mechanism with respect to the stand or counter on which it is mounted whereby the driven rollers, which are disposed in a horizontal plane, may be shifted, together with their power source, in a vertical plane to thus accommodate the height of the driven rollers to the height of the shopping cart being serviced and particularly, the forwardmost lower edge of the basket thereof wherein the idler roller to be accommodated between the driven rollers is positioned. This latter object is of particular importance inasmuch as it has been proposed that scanning modules, in order to effectively function, will necessarily have an uppermost surface and scanning head which is substantially higher than the bottom of baskets of shopping carts presently in use or heretofore contemplated. Accordingly, it is necessary to raise the bottom of such baskets to a greater height and specifically, to a level aligned with the uppermost plane or top of the module or stand carrying the scanning head whereby, as the merchandise is moved from the basket by the belt, as hereinabove described, it passes directly across the scanning head and it is not necessary to raise or lower the merchandise as it is moved from the basket.

Other objects include details of construction which will become apparent from the following specification and accompanying drawings, wherein:

FIG. 1 is a side elevational view showing a shopping cart and the unloading assembly therefor, with the cart being positioned in engagement with the stand, parts being broken away to reveal details of construction;

FIG. 2 is a top plan view of the structure shown in FIG. 1;

FIG. 3 is a substantially central, longitudinal secional view taken along line 3—3 of FIG. 2;

FIG. 4 is a fragmentary sectional view of a portion of the shopping cart and the basket therefor, showing the manner in which the conveyor belt is mounted therein;

FIG. 5 is a view taken along line 5—5 of FIG. 4 and showing a particular form of conveyor belt;

FIG. 6 is a fragmentary, enlarged view showing the details of the roller clutch;

FIG. 7 is a fragmentary view of the cart in engagement with the stand and illustrating one means for retaining the cart with respect to the stand;

Figure 8:
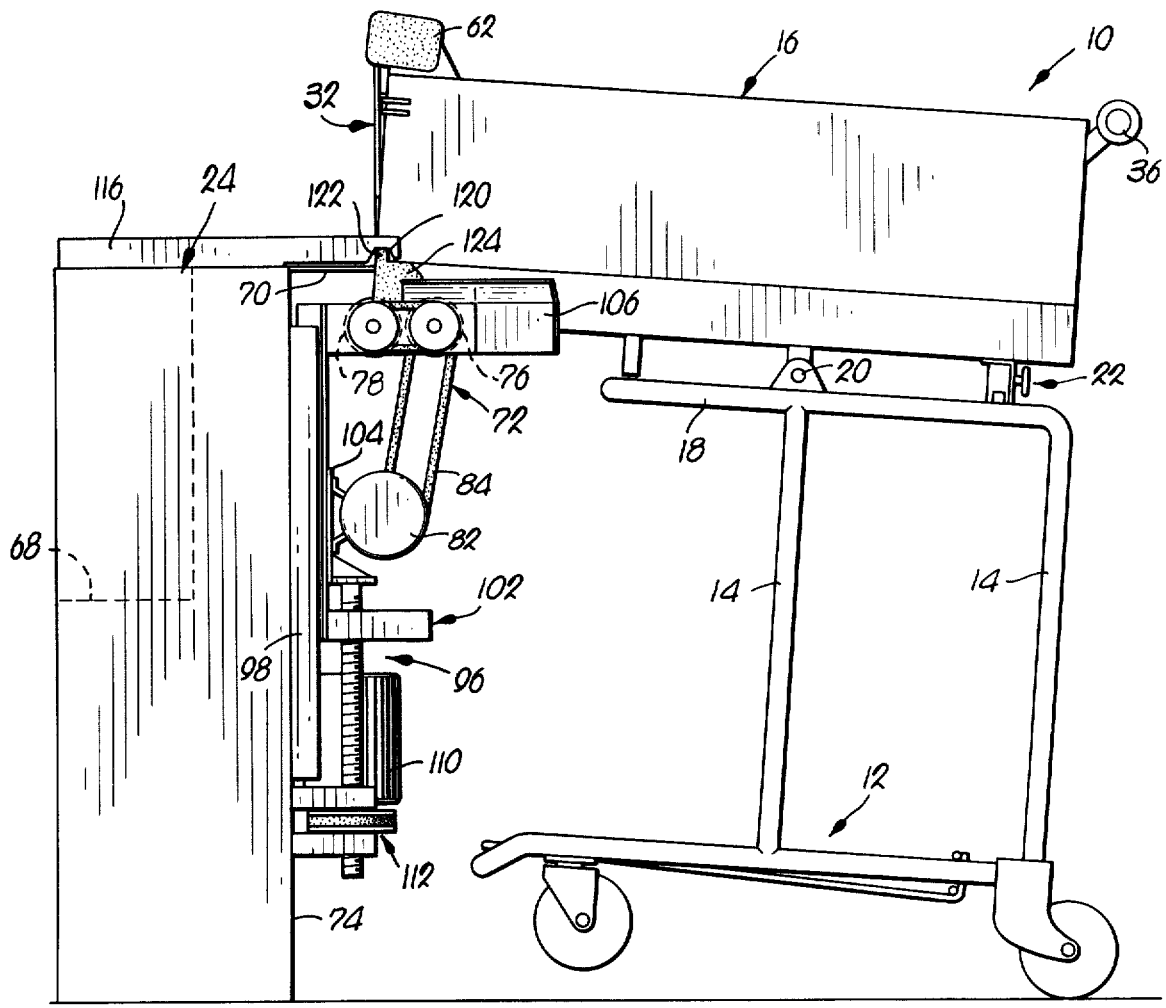
FIG. 8 is a side elevational view showing the shopping cart in engagement with the driving means and with the driving means shifted vertically upwardly by an elevating mechanism.

The shopping cart 10 illustrated in the drawings, is substantially conventional in general nature in that it includes a wheeled base 12 having a plurality of vertical legs 14 extending upwardly therefrom and presenting a framework which supports a basket 16 in a horizontal position, above a horizontal frame member 18 carried at the upper end of vertical members or legs 14. The basket 16 is positioned so as to be swingable about a pivot or fulcrum point 20 whereby the basket may be readily swung from its normally horizontal position of use, as illustrated in the drawings, to a vertical position to permit several of the carts as illustrated, to be nested together in a reduced area of space for storage.

To insure that basket 16 does not swing to the vertical position during its use, a suitable lock 22 is provided whereby to lock the basket in its horizontal position, it being necessary to release said lock before the basket can be swung to its vertical position.

It should be noted that a cart such as illustrated, may be utilized in carrying out the present invention although other types and styles of shopping carts may be readily utilized, such as for instance, the cantilever cart as shown in my U.S. Pat. No. 3,052,319, it being only necessary that suitable framework be provided to support the basket in a horizontal position with the normally forwardmost end of the basket projecting outwardly so as to be engageable with a stand 24.

The basket 16 is composed of a pair of sidewalls 26, a normally rear wall 28, and a forwardmost or front wall 30 which, in the embodiment illustrated, is in the form of a swinging gate 32. A bottom wall 34 is provided for the basket 16, such walls as hereinabove mentioned being fabricated from wire as is conventional in such shopping cart baskets. A suitable handle 36 is provided adjacent rear wall 28 to permit the user of the cart to readily maneuver the same.

Movable means 38 is provided adjacent the bottom wall 34 of the basket 16, such movable means being in the form of a conveyor belt 40 positioned in a horizontal plane overlying the bottom wall 34 of the basket 16. The belt 40 is trained over a rear idler roller 42 and a front idler roller 44 whereby to support the belt in the aforementioned position, there being suitable adjusting devices 46 and 48 for said rollers 42 and 44 respectively, whereby to insure that the belt is retained under the proper tension.

To adequately support the uppermost stretch 50 of the belt 40, there is provided a pan 52 underlying said stretch of the belt, and substantially identical in plan configuration to the bottom wall 34 of the basket 16, said pan 52 being spaced from said bottom wall as shown, for instance, in FIG. 4 of the drawings and being supported in such position by portions of the brackets 54 and 56 which mount idler rollers 42 and 44 and adjusting devices 46 and 48 with respect to the basket 16.

In the embodiment of the invention shown in FIG. 5 of the drawings, the pan 52 is provided with a pair of spacedapart, longitudinally extending grooves 58, which grooves receive corresponding ribs 60 formed on the inner surface of the belt 40, said ribs 60 being seated within the grooves 58 to maintain the belt in alignment and prevent any lateral shifting movement thereof as the goods are placed thereon, or when the belt 40 is driven to unload the contents of the cart 10. The idler rollers are each also provided with grooves, as shown in roller 42 in FIG. 5, to receive correspoonding ribs 60 and aid in preventing lateral movement of the belt 40 as it is driven.

It will be readily appreciated that the belt 40 need not be provided with the ribs 60 to seat within grooves 58 and that the pan 52 may have a planar upper surface, so long as adequate means are provided to prevent any lateral shifting of the belt when it is in use.

The gate 32, which constitutes the front wall 30 of the basket 16, is swingable about a pair of spaced-apart bearing plates 62 which are carried by corresponding sidewalls 26 of the basket 16, whereby the gate 32 may be swung from its closed position, as shown in FIG. 1, to an open condition wherein the gate is positioned in a substantially vertical plane and directly above the front end of the basket 16 to permit the passage of the contents of the basket therefrom and toward the stand 24.

It will be readily recognized that the gate 32 might take other forms such as, for instance, a split front wall whereby to provide outwardly swinging gates which would, when fully opened, extend forwardly from the basket or be swung fully back against the corresponding sidewalls 26 thereof, all to the end that contents initially placed within the basket 16 and supported by upper stretch 50 of belt 40, may be readily moved therefrom as the belt is driven as hereinafter described. In any event, the gate 32 will be provided with suitable holding means whereby to insure that the same is kept in its open condition during unloading of the cart.

The stand 24 may take the form as illustrated in the drawings, which form is in the nature of a scanner module presently offered for sale by International Business Machines Corporation. However, the stand, counter or module 24 may take virtually any different form so long as there is presented a top surface 64 in a horizontal position, generally coplanar with the upper stretch 50 of the belt 40 as the contents of the basket are being delivered from the basket onto the top surface 64 of the counter.

In the embodiment chosen for illustration, the counter 24 is provided with a scanning device or head 66 across which the individual items pass as they move from the cart onto the counter or are placed in bags, which bags may be placed upon a shelf 68 which is formed by an inset portion of the counter, stand or module 24.

To insure a smooth and safe movement of the items from the basket 16 across the scanner head 66, a transition plate 70 extends outwardly from stand 24, is generally coplanar with top surface 64 of the counter and bridges any gap which might exist between the front edge of the cart basket 16 and the top surface 64 of the counter.

In order to operate the present assembly and move goods from within basket 16 across top surface 64 of counter 24, there is provided driving means, broadly designated by the numeral 72, which driving means are mounted on the front wall 74 of the counter 24. The driving means are perhaps best illustrated in FIGS. 1 and 3 and include a pair of driven rollers 76 and 78, defining a seat 80 therebetween, the rollers being in a horizontal position and of substantially the same length as the front idler roller 44 which carries belt 40. Suitable driving means in the nature of an electric motor 82, coupled to a power source, are provided for the driven rollers 76 and 78 whereby, upon actuation of a switch, said rollers may be rotated by the power source 82 through the provision of a belt 84.

As illustrated in FIGS. 1-7, when the idler roller 44 is placed within seat 80, the uppermost surface 50 of the belt 40 is in essentially the same horizontal plane as top surface 64 and transition plate 70 whereby, upon actuation of the rollers 76 and 78 by the power source 82, the rollers will be rotated in a common direction to thereby rotate idler roller 44 and thus drive belt 40 in a direction toward the forward end 30 of the cart 10.

It will, of course, be obvious that as the belt is driven in a forward direction, the contents of the basket, which are supported directly or indirectly by the belt, will be moved in the same direction whereby a checker, who is positioned behind or to the right of counter 24, when said FIGURES of the drawings are viewed, may receive the merchandise as it moves out of the front of the cart through gate 32, insure that the indicia provided thereon is moved across scanning head 66 whereby to record the price of the merchandise on the appropriate computing equipment, and then place the merchandise in a bag supported by the shelf 68 of the counter 24.

It will be appreciated that the controls for the power source 82 of the driving means 72 are under the control of the checker whereby she may control the speed with which the belt moves and the overall movement thereof to insure that a product is not moved too rapidly within the basket to prevent accounting for all of the items by virtue of utilization of scanner head 66.

In order to insure that there is no movement of the cart with respect to the driving means during unloading of the basket in the embodiment of the invention illustrated in FIGS. 1-7, a suitable solenoid-operated latch mechanism 86 is provided on the front wall 74 of the counter 24, the same including a swingable hook 88 which engages the shaft 90 of idler roller 44 extending outwardly therefrom whereby to retain the cart in its desired position with respect to the counter 24 and, more particularly, to retain the idler roller 44 within the seat 80 as the driving means is operated as described above to unload the contents of the cart.

To further insure adequate alignment between the basket 16 and the counter 24, there are provided suitable guides 92 to position the forwardmost end of the basket with respect to the counter 24 and, more particularly, top surface 64 thereof and transition plate 70, all to the end that the basket may be readily positioned by the consumer to permit unloading thereof as described.

It will be appreciated that control means for the latch mechanism 86 can be automatic, or can be under the control of the checker in order that the same may be utilized when necessary. To further insure that the belt is driven in one direction only during unloading of the basket, the driven rollers 76 and 78 are each provided with a suitable roller clutch 94 as illustrated in FIG. 6 so that said rollers may be driven only in one direction, that being the direction required to drive belt 40 in a left-to-right direction viewing FIGS. 1–7 of the drawings.

Figure 9:
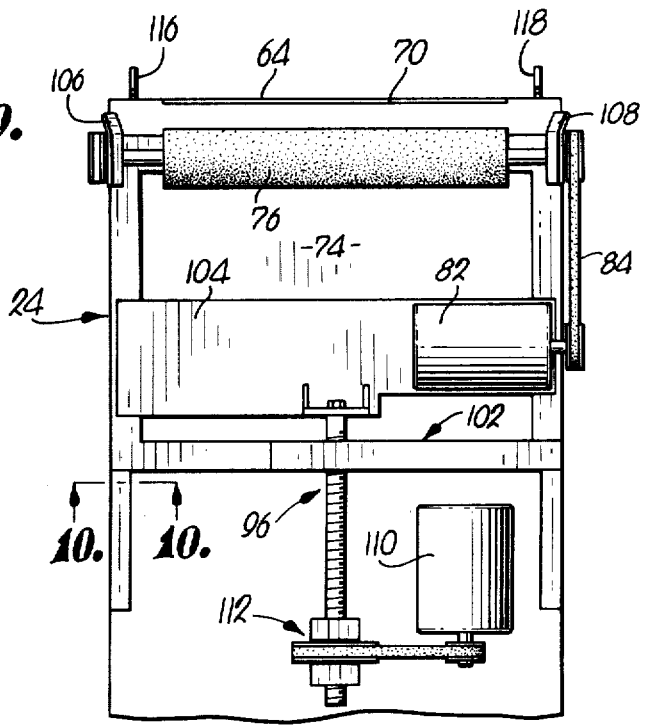
FIG. 9 is a front elevational view of the elevating mechanism and driving means.
Figure 10:
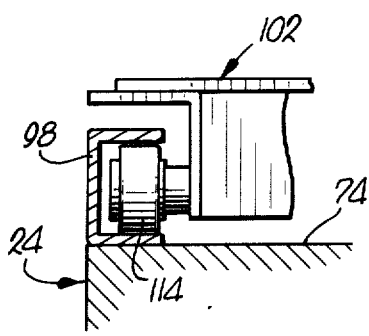
FIG. 10 is a sectional view taken along line 10—10 of FIG. 9.

In the form of the invention illustrated in FIGS. 8–10, the stand 24 carries an elevating mechanism broadly designated by the numeral 96, which elevating mechanism carries the driving means 72 in such a manner that the driving means may be shifted in a vertical path to accommodate the same to a basket which is lower in height than is the top 64 of the stand 24.

The elevating mechanism includes a pair of tracks 98 and 100 which are suitably attached to the front wall 74 of the stand 24, said tracks 98 and 100 shiftably receiving a frame 102, which frame in turn carries the driving means 72 and, more particularly the rollers 76 and 78 and the motor 82 which drive such rollers. The motor 82 is carried by a cross-plate 104 which is a part of the frame 102, and the rollers 76 and 78 are suitably carried by side plates 106 and 108, which plates also serve to guide the front end of the basket 16 and, more particularly, idler roller 44 into engagement with the driving means whereby the idler roller 44 is placed within the seat 80 defined by the driving rollers 76 and 78.

A power source, in the nature of a motor 110, is provided to operate the elevating mechanism, motor 110 being affixed directly to the front wall 74 of the stand 24. The motor 110 operates a suitable worm gear drive unit 112 which, in turn, is coupled with the shiftable frame 102 whereby, upon actuation of the motor 110 by suitable controls provided therefor, the frame 102 is shifted in a vertical path, either upwardly or downwardly, such shifting movement being accomplished by virtue of roller bearings 114 which are carried by the side members of the frame 102 and which are received within tracks 98 and 100 as clearly illustrated in FIG. 10 of the drawings.

Such elevating mechanism has been found to be useful inasmuch as conventional shopping carts, as heretofore known, are provided with a basket which has a bottom approximately 31 inches in height from the supporting surface or floor. However, in developing scanning modules such as those described in this application and manufactured by International Business Machines Corporation, it has been found that such modules or counters must, in order to effectively operate the scanning head thereof, have a height of approximately 39 inches above the supporting surface or floor.

Thus, as a cart such as 10 and illustrated in FIGS. 8–10, is brought toward the counter or stand 24 there is an approximate 8 inches difference in height between the lower or bottom wall of the basket and the top surface 64 of the counter 24. To overcome this variance and thus permit conventional carts, as presently known, to be accommodated to the system and assembly herein described, it is necessary to shift the driven rollers 76 and 78 to a position wherein the seat 80 therebetween may receive the idler roller 44 and the stretch of belt which is trained thereover. To do this, such rollers 76 and 78 must necessarily be lowered approximately 4–8 inches through use of the elevating mechanism 96.

Thus, upon approach of a cart to a stand equipped with the elevating mechanism 96, the checker would actuate motor 110 to drive gear 112 in a given direction to thereby shift the frame 102 and the driving means carried thereby to a position where, as the front end of the basket was moved between guiding side plates 106 and 108, the idler roller would seat within seat 80. The motor 110 would then again be actuated to drive the frame in a vertically upward path, carrying driving means 72 with it and thus raising the front end of the cart as illustrated in FIG. 8 to a position where the uppermost stretch 50 of belt 40 is in substantial alignment with the top surface 64 of the stand 24. This permits utilization of the unloading assembly described herein to move the contents of the basket by the conveyor belt 40 onto the top of the stand 24.

In order to retain the cart in the position shown in FIG. 8 of the drawings a pair of retaining guide bars 116 and 118 are provided on the top 64 of the stand 24, the guide bars each extending outwardly toward the cart a sufficient distance that notches 120 in said guide bars 116 and 118 may receive and retain therewithin a knob 122 formed as a part of a plate 124 carried by the normally forwardmost end of the basket 16. The guide bars 116 and 118 also serve to act as a guide for the items as they are removed from the cart 10, across transition plate 70 and onto the top 64 of the stand 24.

Thus, the embodiment of the invention illustrated in FIGS. 8–10 provides a means for accommodating the unloading assembly to a stand or counter 24 which has a top surface which is necessarily higher than the bottom wall of the basket of the cart which is being utilized in conjunction with such counter. It will be appreciated that, is possible, this problem might be overcome by lowering the height of the counter or, in the alternative, raising the height of the basket of the cart thereby retaining effective operation of the unloading assembly without the necessity of elevating mechanism such as hereinabove described. However, such mechanism makes it possible to utilize conventional carts, as presently known and as provided with a belt therein such as disclosed herein with stands or scanning modules which are presently known and thus accommodating the cart of conventional height and which has been found acceptable to the consumer to the scanning modules which are being presently utilized.

It will be appreciated that there is provided a system or assembly for readily handling and unloading items from a shopping cart wherein the belt provided adjacent the bottom wall of the shopping cart supports the items placed therein by the shopper and, once the basket is full, the cart is wheeled to a position adjacent a stand such as 24 and the user of the cart positions idler 44 in the seat 80, which may be adjusted to the proper height by the checker if necessary, and the driving means is then actuated by the checker whereby to move the belt in a direction toward the counter 24, thus permitting the checker to individually position the items carried by the belt so that the indicia thereon to be read passes over the scanner head 66 and is read and recorded, the items then being immediately placed in a bag for subsequent removal from the premises. It should be noted that cart 10, by virtue of its construction, may yet further be utilized to receive the bags of grocery items, for instance, to transport the same from the check-out position to the exterior of the store, the cart then being returned to the store for further use in the manner hereinabove described.

Having thus described the invention, what is claimed as new and desired to be secured by Letters Patent is:

1. An unloading assembly for a shopping cart comprising:
   a substantially horizontal conveyor belt carried by the cart and supporting the contents of the cart when in use;
   a front and a rear idler roller rotatably carried by the cart, said conveyor belt being trained around said idler rollers;
   a stand engageable by the cart; and
   driving means on the stand for causing movement of the conveyor belt when the cart is brought into engagement with the stand, said driving means including a pair of driven rollers, a power source for simultaneously driving said driven rollers, said driven rollers being spaced apart in a horizontal plane slightly beneath the horizontal plane of the conveyor belt in the cart, the space between said driven rollers defining a seat, the front idler roller and a stretch of the conveyor belt trained therearound being received within the seat with said stretch of the conveyor belt in engagement with both of said driven rollers whereby, upon actuation of the power source for the driven rollers, the conveyor belt in the cart is caused to move.

2. An unloading assembly for a shopping cart as claimed in claim 1, there being means for retaining said front idler roller and a stretch of the belt seated between said driven rollers.

3. An unloading assembly for a shopping cart as claimed in claim 2, said means being in the form of a hook carried by the stand and selectively engageable with said front idler roller.

4. An unloading assembly for a shopping cart as claimed in claim 1, said cart having a bottom pan spanning the distance between said front and rear idler rollers, said pan supporting the normally uppermost length of said belt.

5. An unloading assembly for a shopping cart as claimed in claim 4, said pan having grooves formed therein, said belt having complementary ribs carried thereby and seated within corresponding grooves whereby to guide said belt as it passes around said idler rollers.

6. An unloading assembly for a shopping cart as claimed in claim 1, said stand having guide means thereon to assist in seating said idler roller when the cart is brought into engagement with the stand.

7. An unloading assembly as set forth in claim 1, said driving means being shiftable with respect to the stand.

8. An unloading assembly as set forth in claim 1, said driven rollers and said power source being shiftably carried by the stand whereby to permit vertical shifting movement thereof to lift the cart to place the conveyor belt therein in alignment with the top of the stand.

9. An unloading assembly as set forth in claim 8, there being power means for shifting said driving means in a vertical path.

10. An unloading assembly as set forth in claim 9, there being control means for said power means.

* * * * *